United States Patent [19]

Krajewski et al.

[11] Patent Number: 4,666,686

[45] Date of Patent: May 19, 1987

[54] PROCESS FOR THE FLUID-FLUID EXTRACTION OF GALLIUM, GERMANIUM OR INDIUM FROM LIQUID SOLUTIONS

[75] Inventors: Wolfang Krajewski; Kunibert Hanusch, both of Goslar, Fed. Rep. of Germany

[73] Assignee: Preussag Aktiengesellschaft Metall, Goslar, Fed. Rep. of Germany

[21] Appl. No.: 837,599

[22] Filed: Mar. 7, 1986

[30] Foreign Application Priority Data

Mar. 7, 1985 [DE] Fed. Rep. of Germany ....... 3508041

[51] Int. Cl.$^4$ ...................... C01G 15/00; C01G 17/00
[52] U.S. Cl. ...................................... 423/89; 423/112; 423/DIG. 14
[58] Field of Search ................... 423/89, 112, DIG. 14

[56] References Cited

U.S. PATENT DOCUMENTS

| | | | |
|---|---|---|---|
| 3,637,711 | 1/1972 | Budde et al. | 423/DIG. 14 |
| 3,971,843 | 7/1976 | Helgorsky et al. | 423/112 |
| 4,241,029 | 12/1980 | Helgorsky et al. | 423/112 |
| 4,389,379 | 6/1983 | Bauer et al. | 423/89 |
| 4,432,951 | 2/1984 | Schepper et al. | 423/89 |
| 4,432,952 | 2/1984 | Schepper et al. | 423/89 |
| 4,485,076 | 11/1984 | Bauer et al. | 423/112 |
| 4,559,203 | 12/1985 | Bauer et al. | 423/112 |
| 4,568,526 | 2/1986 | Bauer et al. | 423/89 |

FOREIGN PATENT DOCUMENTS

| | | |
|---|---|---|
| 68541 | 1/1983 | European Pat. Off. . |
| 60-56031 | 4/1985 | Japan ................... 423/112 |

*Primary Examiner*—H. T. Carter
*Attorney, Agent, or Firm*—Lockwood, Alex, FitzGibbon & Cummings

[57] ABSTRACT

A process for the fluid-fluid extraction of gallium, germanium or indium from acid or base hydrous solutions, in which a mixture of at least two hydroxyquinolines in various quantities is employed, is described.

20 Claims, No Drawings

PROCESS FOR THE FLUID-FLUID EXTRACTION OF GALLIUM, GERMANIUM OR INDIUM FROM LIQUID SOLUTIONS

BACKGROUND AND SUMMARY OF THE INVENTION

The invention concerns a process for the fluid-fluid extraction of gallium, germanium, or indium from an acid or base hydrous solution, as well as the pH-controlled precipitation out of the re-extraction solution for the recovery of a Ga-, Ge-, or In-concentrate.

Gallium, germanium, and indium are important raw materials in the semi-conductor industry. Gallium is also used in the technology of super conductors and magnetic materials, as material in lasers, as as well as a catalyst in chemical reactions. Germanium is used as a doping material in $SiO_2$-light wave conductors, and, above all else, in ultraoptics, as well as as a detector material. Indium has versatile use possibilities in base metals, specialized solders, magnetic materials in high-frequency technology and transistor manufacturing, as well as in salts in the lamp, glass, and ceramics industry or as a component of metallic components in the measuring, condensor, thermistor and infrared industries.

Common to these metals is the presence in only slight concentrations and as accompanying minerals of a aluminum, lead, copper, and zinc ores. Thus, Ga, Ge, and In accumulate, in greater or lesser concentrations, in intermediate or waste products in the metallurgy of these base metals. They have particular significance for the concentration stages of the extraction process. Lyeing, precipitating, cementation, adsorption, chlorination and electrolysis processes, as well as the use of ion exchangers, have been developed.

The use of solvent extraction agents, which work as selectively as possible, can also lead to favorable concentrations in the re-extraction solution or intermediate product, if high extraction capacity and re-extraction capacity exist.

Thus, it is known from DOS 24 23 355, for example, to use the oxime 19-hydroxyhexatriaconta-9,28-diene 18-oxime dissolved in an organic solvent for the extraction of germanium.

The use of a substituted 8-hydroxyquinoline as an extraction agent, which is dissolved in an organic solvent and is to be used at specific temperatures, is described in the European Patent No. 68,541.

One disadvantage in the use of a compound such as cited in the state of the art is the tendency of such compounds to bind with other metal ions, such as Cu, for example, and in differing quantities according to the raw material and its concentrations, and to thus be insufficiently selective. Therefore, Cu must, for example, be eliminated by means of a special process, for example, cementation in the acidic medium. In such a solvent extraction process, the phase separation is frequently so slow that the process is made difficult and uneconomical.

It is the task of the present invention to propose a process of the type described above for a solvent extraction by using hydroxyquinolines, which is more advanced and has an improved selectivity as well as capacity for the elements named, which has a more rapid phase separation, and which makes possible an optimal adjustment of the density and viscosity of the organic phase, with consideration to the other process parameters.

DESCRIPTION OF THE PREFERRED EMBODIMENTS

This task is solved by using a mixture of at least two hydroxyquinolines of different densities, molecular weights and viscosities.

By hydroxyquinoline should be understood all such compounds as can be used as solvent extraction agents in this area.

Particularly advantageous is the use of mixtures of various quantities of a substituted 8-hydroxyquinoline, especially of 7-alkenyl-8-hydroxyquinoline which is sold under the trade name of "Kelex 100" thought to be 7-[4-ethyl-1-methyloctyl]-8-hydroxyquinoline by the firm Sherex Chemical Company, Inc., of Dublin, Ohio, USA, which has the following characteristics:
Molecular weight: 229;
Flash point: Greater than 93 (°C.);
Density (20° C.): 0.986 (g/ml);
Viscosity: 150 (cps) (25° C.).
and 7-alkenyl-8-hydroxyquinoline, which is sold under the trade name "LIX 26" by the firm Henkel Corporation in Minneapolis, Minn., USA, which has the following characteristics:
Molecular weight: 315;
Flash point: Greater than 100 (°C.);
Density (20° C.): 0.98 (g/ml);
Viscosity: 270 (cps) (30° C.).

In accordance with the basic idea of the invention, the mixture of both of the above hydroxyquinolines fluctuate within the range of 8 to 50 volume % of "Kelex 100", while one or the other hydroxyquinolines makes up the rest, up to 100 volume %.

Although the above mixture of hydroxyquinolines has surprisingly good results, other mixtures can be made with several and more hydroxyquinolines, such as, for examples, those described in U.S. Pat. No. 3,637,711, which is hereby incorporated by reference.

In any event, the use of such a mixture of hydroxyquinolines in accordance with the invention permits the optimization of the solvent extraction process through the adjusted synergistic effects, so that the extraction capacity of the mixture is higher than that of the individual hydroxyquinolines.

If that is to say, a mixture of hydroxyquinoline is used as an extraction agent, it can be attained that, as a result of the synergistic effect, the extraction capacity of the mixture is greater than that of the individual hydroxyquinoline.

In addition, the density and the viscosity of the organic phase can be so optimized with the mixture portions that a rapid phase separation $V_{org.}/V_{aqu.}$ is attained. Also, the selectivity as well as the re-extraction effectiveness can be influenced by the hydroxyquinoline portions in the mixture, which can be optimized in type and quantity of the modifiers and solvents in the special use of extraction, so that the temperatures of the process steps can have a considerable influence. By means of a simple pH-adjustment, the hydroxides and, after a heat treatment, the enriched oxides, can be obtained from such re-extraction solutions. An after-washing can be necessary for the removal without residues of the organic phase.

The process for fluid-fluid extraction mainly concerns the elements gallium, germanium, or indium, in order to obtain a concentrated concentrate of acid or base hydrous solutions. Through the fluid-fluid extraction with a mixture of hydroxyquinolines (for example, "Kelex 100" from the firm Sherex, USA, and "LIX 26" from the firm Henkel Corporation, USA), there comes an extraction and enrichment process for Ga, Ge, or In, which, because of the synergistic effect, has high extraction capacity; if a high adjustment capacity to density and viscosity is attained through the selection of hydroxyquinoline portions in the mixture, this is one which improves the phase separation capacity $V_{org.}/V_{aqu.}$, and which can be adjusted optimally as to type and quantity of modifier and solvent.

Tri-n-butyl phosphate (TBP) and/or tri-n-octylphosphine-oxide (TOPO) and isodecanol, dissolved in kerosene, serve as modifiers. This is extracted at room temperature or at a higher temperature, and reextracted at a higher temperature, especially 55° C., with an alkaline solution (for example, 100 to 250 g of NaOH/l). The organic solvent extraction solution flows in a cycle. A Ga-, Ge-, or In concentrate can be obtained from the alkaline, enriched re-extraction solution, for example, through pH-controlled precipitation. For the removal of the residual organic phase, the precipitation product can be subjected to a washing process, especially with an organic solvent.

A water or acid washing stage between re-extraction and extraction can be provided for lengthy use during the organic phase.

The invention will be illustrated in greater detail in the examples and comparative examples cited in the following.

EXAMPLE 1

From an alkaline solution of Bayer Bauxite composition (130 g Na$_2$O/l; 40 g Al/l; 109 mg Ga/l), gallium is extracted in several stages at 35° C. through solvent extraction with an extraction solution on the basis of 15 volume % of a hydroxyquinoline mixture consisting of 10 volume % "Kelex 100", and 90 volume % of "LIX 26", with 40 volume % isodecanol and 0.1 mol TOPO, dissolved in kerosene, with a volume ratio of $V_{org.}:V_{aqu.}=1:1$, and a Ga-capacity in the organic phase of 20 mg/l, and then reextracted at 55° C. and a volume ratio of $V_{org.}:V_{aqu.}=10:1$, with an alkaline solution (220 g NaOH/l). In this, the enrichment factor amounts to approximately 7.

EXAMPLE 2

From an acidic sulfatic solution, such as precipitates, for example, during the lyeing of chimney soot (220 mg Ge/l; 110 g Zn/l; 32 g H$_2$SO$_4$/l), germanium at 35° C. is extracted through solvent extraction with an extraction solution on the basis of 15 volume % of a hydroxyquinoline consisting of 10 volume % "Kelex 100" and 90 volume % of "LIX 26", with 40 volume % isodecanol and 0.1 mol TOPO, dissolved in kerosene, with a germanium extraction capacity of 0.6 g Ge/l of the organic phase, and reextracted at 55° C. with a volume ratio of $V_{org.}:V_{aqu.}=10:1$, with an alkaline solution (200 g NaOH/l). From the re-extraction solution, germanium hydroxide is precipitated out, after pH adjustment to 9.5 with HCl. After filtration, washing and drying, the residue contains 45% GeO$_2$, and filtrate is less than 50 mg Ge/l.

EXAMPLE 3

From a sulfuric acid solution (3.5 g In/l), indium is, at 35° C., extracted in several stages through solvent extraction with an extraction solution on the basis of 15 volume % of a hydroxyquinoline mixture consisting of 10 volume % "Kelex 100" and 90 volume % "LIX 26", with 40 volume % isodecanol and 0.1 mol TOPO, dissolved in kerosene, with an extraction capacity of 0.5 g In/l organic phase, and then reextracted at 55° C. and a volume ratio of $V_{org.}:V_{aqu.}=10:1$, with a acidic solution (196 g H$_2$SO$_4$/l). The enrichment factor in the reaction solution amounts to approximately 10.

EXAMPLE 4

From an acidic sulfatic solution (140 mg Ge/l; 53 g Zn/l; 25 g free H$_2$SO$_4$/l), germanium, at 35° C., is extracted in one phase through solvent extraction, with an extraction solution on the basis of 15 volume % of a hydroxyquinoline mixture consisting of 50 volume % "Kelex 100" and 50 volume % "LIX 26" with 25 volume % isodecanol and 0.05 mol TOPO, dissolved in kerosene, with a volume ratio of $V_{org.}:V_{aqu.}=1:1$, with an extraction capacity of 0.13 g Ge/l organic phase, and then reextracted at 55° C. and a volume ratio $V_{org.}:V_{aqu.}=10:1$, with an alkaline solution (200 g NaOH/l). The concentration factor for germanium in the reextraction solution amounts to approximately 8.

EXAMPLE 5

From a lye which contains gallium (109 mg Ga/l, 40 g Al/l, 130 g Na$_2$O/l), and a volume ratio of $V_{aqu.}:V_{org.}=1:2$, gallium, at 35° C. is extracted to a residual content of less than 10 mg/l through solvent extraction with an extraction solution on the basis of 15 volume % hydroxyquinoline mixture*, 25 volume % isodecanol, and 0.1 mol TOPO dissolved in kerosene. The re-extraction with an alkaline solution (300 g NaOH/l) at 60° C. and a volume ratio of $V_{org.}:V_{aqu.}=10:1$ enriches the gallium by a factor of 5.

EXAMPLE 6

Germanium is extracted to a residual content of less than 5 mg Ge/l from a germanium-bearing sulfuric acid solution (140 mg Ge/l, 53 g Zn/l, 25 H$_2$SO$_4$/l), at 35° C. and a volume ratio of $V_{aqu.}:V_{org.}=1:1$, with an extraction solution on the basis of 15 volume % hydroxyquinoline mixture*, 25 volume % isodecanol, and 0.05 mol TOPO, dissolved in kerosene. The re-extraction takes place at 60° C. and a volume ratio of $V_{org.}:V_{aqu.}=10:1$, with an alkaline solution (200 g NaOH/l). The Ge-enrichment factor amounts to 6.

* Hydroxyquinoline as specified in Example 1.

EXAMPLE 7

Germanium is extracted up to a residual content of less than 10 mg Ge/l from a sulfuric acid solution containing germanium (504 mg Ge/l, 20 g Zn/l, 22 g Vu/l, 9 g Fe/l, 50 g H$_2$SO$_4$/l), with an extraction solution on the basis of 10 volume % hydroxyquinoline* 25 volume % isodecanol and 0.05 mol TOPO dissolved in kerosene at 35° C. and a volume ratio of $V_{aqu.}:V_{org.}=1:1$. In the re-extraction with an alkaline solution (200 g NaOH/l) at 55° C. and a volume ratio of $V_{org.}:V_{aqu.}=10:1$, a Ge enrichment of 1:8 is attained.

EXAMPLE 8

From a sulfuric acid solution which contains Indium (3.5 g In/l, 35 g H$_2$SO$_4$/l, Indium is extracted through solvent extraction at 35° C. and a volume ratio of $V_{aqu.}:V_{org}=1:5$. The extraction solution is based on 10 volume % of hydroxyquinoline mixture*, 25 volume % isodecanol, and 0.1 mol TOPO dissolved in kerosene. The re-extraction with 3n $H_2SO_4$ solution at 60° C. and a volume ratio of $V_{org}:V_{aqu}=20:1$ leads to an Indium enrichment, by a factor of 5.

* Hydroxyquinoline as specified in Example 1.

Examples of the Comparative Use of a Simple Hydroxyquinoline (Oxime)

COMPARATIVE EXAMPLE 1

Germanium is extracted at 35° C. from a sulfuric acid solution (140 mg Ge/l; 25 g free $H_2SO_4$/l) through solvent extraction with an extraction solution (15 volume % "Kelex 100"; 40 volume % isodecanol and 0.05 mol TOPO dissolved in kerosene) with a volume ratio of $V_{aqu}:V_{org}=1:1$, with an extraction capacity of 0.08 g Ge/l organic phase, and then reextracted at 60° C. and a volume ratio $V_{org}:V_{aqu}=10:1$, with an alkaline solution (220 g NaOH/l). The enrichment factor for germanium in the reaction solution amounts to approximately 3.

COMPARATIVE EXAMPLE 2

Germanium is extracted at 35° C. from a sulfuric acid solution (15 volume % "Kelex 100"; 25 g free $H_2SO_4$/l) through solvent extraction with an extraction solution (10 volume % Kelex 100; 25 volume % isodecanol and 0.1 mol TBP dissolved in kerosene) with a volume ratio of $V_{aqu}:V_{org}=1.1$, with an extraction capacity of 0.01 g Ge/l organic phase, then reextracted at 55° C. and a volume ratio of $V_{org}:V_{aqu}=10:1$, with an alkaline solution (200 g NaOH/l). The concentration factor for germanium in the re-extraction solution amounts to approximately 2.

Examples 1, 3 and 4 have concentration factors of 7, 10, and 8. Examples 5 to 8 have concentration factors for the metal of 5, 6 8 and 5.

The comparative examples 1 and 2 appended at the end use no hydroxyquinoline mixtures in accordance with the invention, but only simple hydroxyquinolines, namely, "Kelex 100". From this it can be seen that the concentration factor for germanium in the comparative example 1 is only 3, and the concentration factor in comparative example 2 is only 2. The mixture in accordance with the invention is thus much better, and thus also more progressive than the use of a simple hydroxyquinoline.

What is claimed is:

1. A process for the fluid-fluid extraction of gallium, germanium or indium from an acid or base hydrous solution, comprising the steps of:
   (a) contacting said solution with an organic liguid including a mixture that contains at least 7-alkenyl-8-hydroxyquinoline having the trade name Kelex 100 and a 7-alkenyl-8-hydroxyquinoline having the trade name LIX-26 thereby producing a gallium, germanium or indium-loaded organic phase and an aqueous phase depleted in gallium, germanium or indium;
   (b) separating said gallium, germanium or indium-loaded organic phase from said aqueous phase depleted in gallium, germanium or indium;
   (c) contacting said organic phase with an alkaline hydrous solution thereby producing a gallium, germanium or idium-loaded alkaline hydrous solution; and,
   (d) separating the gallium, germanium or indium compound from said alkaline hydrous solution.

2. A process according to claim 1, wherein said mixture of hydroxyquinolines contains one hydroxyquinoline in a range of about 8 to about 50 volume % and the other hydroxyquinoline forms the balance up to 100 volume %.

3. A process according to claim 2, wherein said mixture of hydroxyquinolines contains about 10 volume % of 7-alkenyl-8-hydroxyquinoline having the trade name KELEX 100 and about 90 volume % of 7-alkenyl-8-hydroxyquinoline having the trade name LIX-26.

4. A process according to claim 2, wherein said hydroxyquinolines are mixed with about 25 to about 40 volume % of isodecanol and about 0.1 mole of tri-n-octylphosphineoxide dissolved in a quantity of kersene resulting in a mixture containing about 15 volume % of the hydroxyquinolines.

5. A process according to claim 2, wherein said mixture of hydroxyquinolines is used with solvents, solution mediators and other components, said mixture being extracted in one or more stages and being re-extracted at temperatures of about 55° C. with an alkaline or acidic solution.

6. A process according to claim 1 wherein said mixture of 7-alkenyl-8-hydroxyquinolines contains one 7-alkenyl-8-hydroquinoline in a range of about 8 to about 50 volume % and the other 7-alkenyl-8-hydroxyquinoline forms the balance up to 100 volume %.

7. A process according to claim 6, wherein said mixture of hydroxyquinolines contains about 10 volume % of 7-alkenyl-8-hydroxyquinoline having the trade name KELEX 100 and about 90 volume % of 7-alkenyl-8-hydroxyquinoline having the trade name LIX-26.

8. A process according to claim 6, wherein said hydroxyquinolines are mixed with about 25 to about 40 volume % of isodecanol and about 0.1 mole of tri-n-octylphosphineoxide dissolved in a quantity of kerosene resulting in a mixture containing about 15 volume % of the hydroxyquinolines.

9. A process according to claim 6, wherein said mixture of hydroxyquinolines is used with solvents, solution mediators and other components, said mixture being extracted in one or more stages and being re-extracted at temperatures of about 55° C. with an alkaline or acidic solution.

10. A process according to claim 1, wherein said mixture of hydroxyquinolines comprise 7-alkenyl-8-hydroxyquinoline having the trade name KELEX 100 in a range of about 8 to about 50 volume % and the other 7-alkenyl-8-hydroxyquinoline having the trade name LIX-26 forms the balance up to 100 volume %.

11. A process according to claim 10, wherein said mixture of hydroxyquinolines contains about 10 volume % of 7-alkenyl-8-hydroxyquinoline having the trade name KELEX 100 and about 90 volume % of 7-alkenyl-8-hydroxyquinoline having the trade name LIX-26.

12. A process according to claim 10, wherein said hydroxyquinolines are mixed with about 25 to about 40 volume % of isodecanol and about 0.1 mole of tri-n-octylphosphineoxide dissolved in a quantity of kerosene resulting in a mixture containing about 15 volume % of the hydroxyquinolines.

13. A process according to claim 10, wherein said mixture of hydroxyquinolines is used with solvents, solution mediators and other components, said mixture being extracted in one or more stages and being re-extracted at temperatures of about 55° C. with an alkaline or acidic solution.

14. A process according to claim 1, wherein said mixture of hydroxyquinolines contains about 10 volume % of 7-alkenyl-8-hydroxyquinoline having the trade name KELEX 100 and about 90 been volume % of 7-alkenyl-8-hydroxyquinoline having the trade name LIX-26.

15. A process according to claim 14, wherein said mixture of hydroxyquinolines is used with solvents, solution mediators and other components, said mixture being extracted in one or more stages and being re-extracted at temperatures of about 55° C. with an alkaline or acidic solution.

16. A process according to claim 1, wherein said hydroxyquinolines are mixed with about 25 to about 40 volume % of isodecanol and about 0.1 mole of tri-n-octylphosphineoxide dissolved in a quantity of kerosene resulting in a mixture containing about 15 volume % of the hydroxyquinolines.

17. A process according to claim 16, wherein said mixture of hydroxyquinolines is used with solvents, solution mediators and other components, said mixture being extracted in one or more stages and being re-extracted at temperatures of about 55° C. with an alkaline or acidic solution.

18. A process according to claim 1, wherein said hydroxyquinolines are mixed with about 25 to about 40 volume % of isodecanol and about 0.1 mole of tri-n-octylphosphineoxide dissolved in a quantity of kerosene resulting in a mixture containing about 15 volume % of the hydroxyquinolines.

19. A process according to claim 1, wherein said mixture of hydroxyquinoline is used with solvents, solution mediators and other components, said mixture being extracted in one or more stages and being re-extracted at temperatures of about 55° C. with an alkaline or acidic solution.

20. A process according to claim 1, wherein said mixture of hydroxyquinolines is used with solvents, solution mediators and other components, said mixture being extracted in one or more stages and being re-extracted at temperatures of about 55° C. with an alkaline or acidic solution.

* * * * *

UNITED STATES PATENT AND TRADEMARK OFFICE
CERTIFICATE OF CORRECTION

PATENT NO. : 4,666,686

DATED : May 19, 1987

INVENTOR(S) : Krajewski et al.

It is certified that error appears in the above-identified patent and that said Letters Patent is hereby corrected as shown below:

Column 1, line 17, delete "as" after "lasers"; line 28, delete "a" after "of";

Column 2, line 14, "alkenyl" should read --alkyl--;

Column 4, lines 47-48, "Ge-enrichment" should read --Ge enrichment--; line 54, "Vu" should read --Cu--; line 65, that portion of the formula reading "(3.5 g In/l, 35 g $H_2SO_4$/l" should read --(3.5 g In/l, 35 g $H_2SO_4$/l).--;

Column 5, line 52, "liguid" should read --liquid--; line 53, "alkenyl" should read --alkyl--;

Column 6, line 8, "alkenyl" should read --alkyl--; line 24, lines 24-25 and line 26, all three occurrences of "7-alkenyl-8-" should be deleted; line 30, "alkenyl" should read --alkyl--; line 46, "alkenyl" should read --alkyl--; line 53, "alkenyl" should read --alkyl--;

Column 7, line 3, "alkenyl" should read --alkyl--; line 4, delete "been".

UNITED STATES PATENT AND TRADEMARK OFFICE
CERTIFICATE OF CORRECTION

PATENT NO. : 4,666,686

DATED : May 19, 1987

INVENTOR(S) : Wolfgang Krajewski and Kunibert Hanusch

It is certified that error appears in the above-identified patent and that said Letters Patent is hereby corrected as shown below:

Page 1, column 1, item [75] "Wolfang" should be deleted and --Wolfgang-- inserted.
Column 5, line 54, delete "Kelex" and insert --KELEX--.
Column 6, line 14, delete "kersene" and insert --kerosene--.
Column 6, line 65, delete "sald" and insert --said--.

Signed and Sealed this

Fifteenth Day of March, 1988

Attest:

DONALD J. QUIGG

Attesting Officer

Commissioner of Patents and Trademarks